US010838222B2

(12) United States Patent
Khachaturian et al.

(10) Patent No.: US 10,838,222 B2
(45) Date of Patent: Nov. 17, 2020

(54) COHERENCE ARTIFACTS SUPPRESSION IN INTEGRATED PHOTONIC SYSTEMS

(71) Applicant: California Institute of Technology, Pasadena, CA (US)

(72) Inventors: Aroutin Khachaturian, Glendale, CA (US); Seyed Mohammadreza Fatemi, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 88 days.

(21) Appl. No.: 16/274,110

(22) Filed: Feb. 12, 2019

(65) Prior Publication Data

US 2019/0293956 A1    Sep. 26, 2019

Related U.S. Application Data

(60) Provisional application No. 62/629,409, filed on Feb. 12, 2018.

(51) Int. Cl.
| | | |
|---|---|---|
| G02B 27/00 | (2006.01) | |
| G02B 27/48 | (2006.01) | |
| G02F 1/29 | (2006.01) | |
| G02B 27/28 | (2006.01) | |

(52) U.S. Cl.
CPC ......... *G02B 27/48* (2013.01); *G02B 27/0087* (2013.01); *G02B 27/286* (2013.01); *G02F 1/292* (2013.01)

(58) Field of Classification Search
CPC .......... G01S 13/04; G01S 15/04; G01S 15/06; G01S 17/04; B60N 2/002; H04N 5/225; H04N 5/2256; H04N 9/045; H04N 9/735; H04N 21/4223; H04N 5/23219; H04N 5/335; G06K 9/00362; G02B 27/0087; G02B 27/286; G02B 27/48; G02F 1/292
USPC .......................................... 250/208.1, 214 R
See application file for complete search history.

(56) References Cited

U.S. PATENT DOCUMENTS 9,934,598 B2 *    4/2018    Lee ....................... G06T 11/005

* cited by examiner

*Primary Examiner* — Que Tan Le
(74) *Attorney, Agent, or Firm* — Alston & Bird LLP

(57) ABSTRACT

An optical phased array includes, in part, a multitude of receiving elements arranged along N rows and M columns, and a controller configured to activate a first subset of the receiving elements during a first time interval to capture first data representative of a first image of a target, to activate a second subset of the receiving elements during a second time interval to capture second data representative of a second image of the target, and to combine the first and second data to generate the image of the target. The first and second subsets may share common receiving elements. The controller may be further configured to compute an average of the first and second data to generate the image of the target. The first subset may represent a subset of the M columns.

31 Claims, 7 Drawing Sheets

COHERENCE ARTIFACTS SUPPRESSION IN INTEGRATED PHOTONIC SYSTEMS

CROSS REFERENCE TO RELATED APPLICATIONS

The present application claims benefit under 35 USC 119(e) of U.S. Application Ser. No. 62/629,409 filed Feb. 12, 2018, the content of which is incorporated herein by reference in its entirety.

FIELD OF THE INVENTION

The present invention is related to photonics systems, and more particularly to reducing the coherent artifacts in such systems.

BACKGROUND OF THE INVENTION

Optical systems benefit from the relatively high degree of temporal and spatial coherence that a coherent optical source can provide. For example, in an imaging system, the coherence of the source can be used to reconstruct not only the intensity of the target but also the time of flight, which can be used to determine the range of the target. Furthermore, variations in the phase of a coherent source can be used in material composition detection and spectroscopic applications. In addition, a coherent source makes it possible to form a lens-free projector or imager with a relatively small form factor.

Despite these advantages, the coherence of the source results in artifacts that need to be mitigated for proper system operation. In an optical system incorporating a coherent source, two such artifacts are edge ringing and speckle patterns that distort the quality of the projected or received optical signal. Such artifacts reduce the contrast of the captured or projected image.

Speckle patterns, which arise from surface roughness of the imaging target, reduce the signal-to-noise (SNR) and result in destructive interference of the light at the receiver aperture. This effect takes place when the size of the surface roughness is on the order of or larger than the wavelength of the exciting light. Consequently, the reconstructed image contains dark black spots that can distort the received light to the point that in many cases it may not be possible to reconstruct the target image. A need continues to exist for reducing the effect of the speckle pattern.

BRIEF SUMMARY OF THE INVENTION

An optical phased array, in accordance with one embodiment of the present invention, includes, in part, a multitude of receiving elements arranged along N rows and M columns, and a controller configured to activate a first subset of the receiving elements during a first time interval to capture first data representative of a first image of a target, activate a second subset of the receiving elements during a second time interval to capture second data representative of a second image of the target, and combine the first and second data to generate a third image of the target.

In one embodiment, the first and second subsets share common receiving elements. In one embodiment, the controller is further configured to compute an average of the first and second data to generate the third image of the target. In one embodiment, the first subset represents a subset of the M columns. In one embodiment, the second subset represents a second subset of the M columns different from the first subset, wherein at least one of the M columns is common to both the first and second subsets.

In one embodiment, the first subset includes the N rows. In one embodiment, the first subset represents a subset of the N rows. In one embodiment, the second subset represents a second subset of the N rows different from the first subset, wherein at least one of the N rows is common to both the first and second subsets.

In one embodiment, the first subset includes the M columns. In one embodiment, the first and second time intervals are non-overlapping time intervals. In one embodiment, the optical phased array is integrated in a semiconductor substrate.

A method of forming an image of a target, in accordance with one embodiment of the present invention, includes, in part, activating a first subset of the receiving elements of an optical phased array during a first time interval to capture first data representative of a first image of a target, activating a second subset of the receiving elements of the optical phased array during a second time interval to capture second data representative of a second image of a target, and combining the first and second data to generate a third image of the target.

In one embodiment, the first and second subsets share common receiving elements. In one embodiment, the method further includes, in part, computing an average of the first and second data to generate the third image of the target. In one embodiment, the first subset represents a subset of the M columns. In one embodiment, the second subset represents a second subset of the M columns different from the first subset, wherein at least one of the M columns is common to both the first and second subsets.

In one embodiment, the first subset includes the N rows. In one embodiment, the first subset represents a subset of the N rows. In one embodiment, the second subset represents a second subset of the N rows different from the first subset, wherein at least one of the N rows is common to both the first and second subsets. In one embodiment, the first subset includes the M columns. In one embodiment, the first and second time intervals are non-overlapping time intervals. In one embodiment, the optical phased array is integrated in a semiconductor substrate.

An optical phased array, in accordance with one embodiment of the present invention, includes, in part, a first transmitting element having a first polarization and adapted to transmit a first optical signal along the first polarization direction toward a target, a second transmitting element having a second polarization and adapted to transmit a second optical signal along the second polarization direction toward the target, a first receiving element having the first polarization and adapted to receive the first optical signal reflected off the target, a second receiving element having the second polarization and adapted to receive the second optical signal reflected off the target, and a controller configured to form an image of the target in accordance with the first and second received optical signals.

An optical phased array, in accordance with one embodiment of the present invention, includes, in part, a first transmitter configured to generate a first illumination pattern on a target, a second transmitter configured to generate a second illumination pattern on the target, a receiver array configured to collects light reflected off the target in response to the first and second illumination patterns, and a controller configured to operate the first and second transmitters during first and second non-overlapping time intervals thereby to form an image of the target by combining outputs of the receiver.

In one embodiment, the first transmitter includes an array of transmitting elements. In one embodiment, the second transmitter includes an array of transmitting elements. In one embodiment, the receiver includes an array of receiving elements. In one embodiment, the second transmitter includes an array of transmitting elements. In one embodiment, the optical phased array is integrated in a semiconductor substrate.

An optical phased array, in accordance with one embodiment of the present invention, includes, in part, an array of transmitting elements each adapted to illuminate a target with an optical signal; generate a signal whose phase and amplitude are varied in response to a controller, wherein each transmitting element is adapted to illuminate a target, a receiver array adapted to receive the optical signals reflected off the target, an controller configured to: vary a phase and an amplitude of the signal transmitted by each transmitting element thereby to cause the transmitting elements to generate a first illumination pattern during a first time interval and a second illumination pattern during the second time interval. The first and second time intervals being non-overlapping time intervals. The controller is further configured to combine the optical signals received by the receiver array during the first and second time intervals to form an image of the target. In one embodiment, the optical phased array is integrated in a semiconductor substrate.

DETAILED DESCRIPTION OF THE INVENTION

Embodiments of the present invention reduce the speckle density in a number of ways. For a fully developed speckle pattern, the speckle density is dependent on optical wavelength, polarization, illumination distance, and illumination spot size, as defined below:

$$n_v = \frac{K}{A_c} \tag{1}$$

Figure 1:
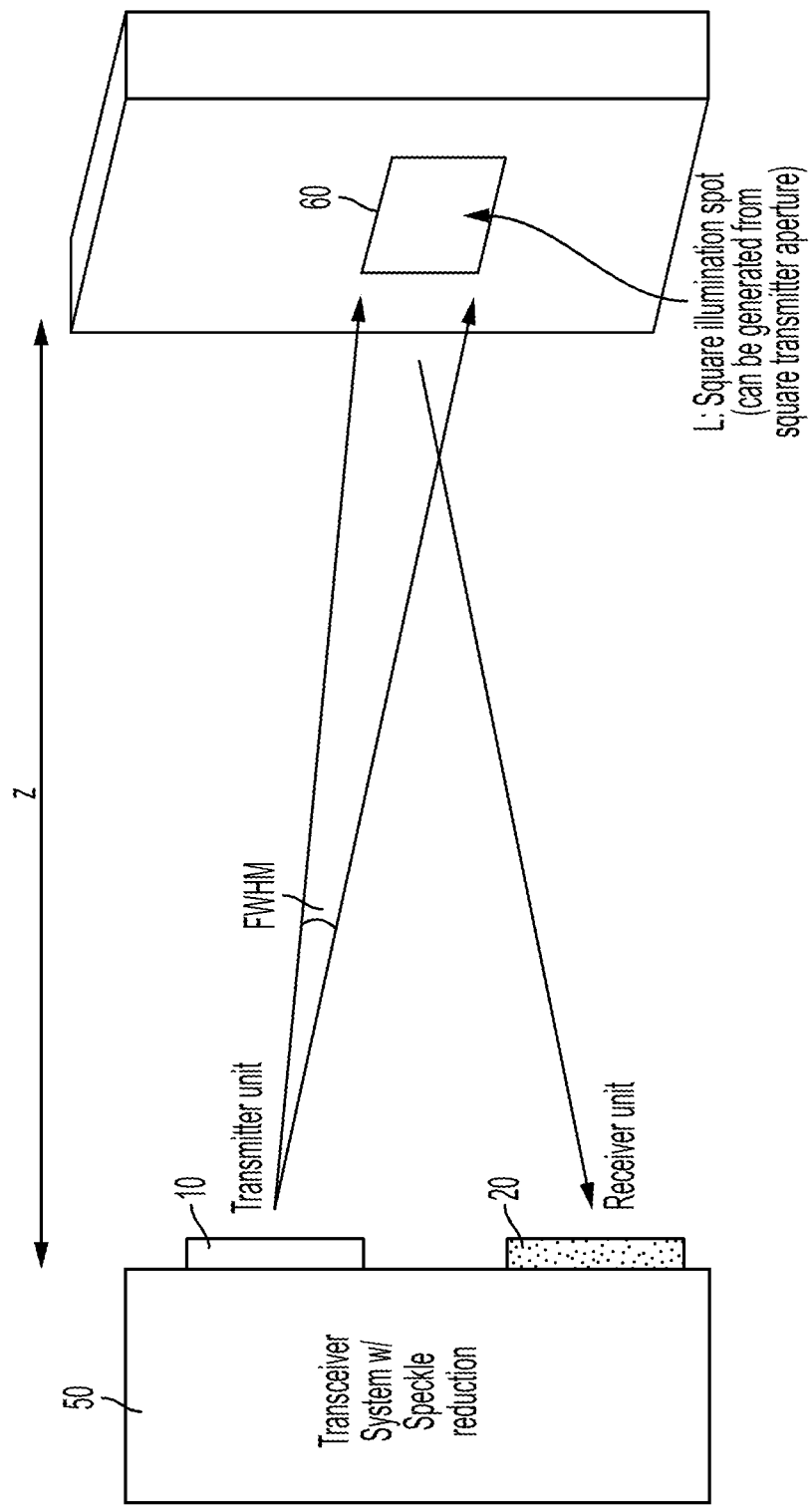
FIG. 1 shows an optical phased array transceiver, in accordance with one embodiment of the present invention.

In expression (1), $n_v$ represents the density of speckle vortices, K is a constant that is geometry dependent, and $A_c$ is defined below. FIG. 1 shows an optical transceiver 50 forming an image of target 60, in accordance with one embodiment of the present invention. Transceiver 50, shown as including, in part, a transmitter unit 10 and a receiver unit 20, is spaced away from target 60 by distance z. For a square aperture the following expressions apply:

$$A_c = \left(\frac{\lambda^2 z^2}{L^2}\right) \tag{2}$$

$$\frac{b}{\sigma^2} = \left(\frac{\pi^2}{3A_c}\right) \tag{3}$$

$$n_v = \frac{b/\sigma^2}{2\pi} \tag{4}$$

In expression (2), z represents the distance between the transceiver and the target, $L^2$ represents the area of the target (see, for example, "Speckle Phenomena in Optics" by Joseph Goodman, 2006) Assume an optical wavelength $\Delta=1.55$ μm, z=20 cm, a projection full-width half-minimum of 2 degrees and the density n, =1593/mm². For a receiver aperture of 150 μm×150 μm, the average number of vortices is around 36. For a more detailed understanding In accordance with embodiments of the present invention, by varying any one of a number of parameters, the speckle intensity pattern may be changed while keeping the target image constant. For each set of parameters a different intensity pattern is recorded that is representative of the summation of the target image intensity and a different speckle intensity pattern. By combining (such as averaging) the captured intensity patterns, the effect of the speckle pattern is suppressed, thus leading to an improvement in the target image to speckle intensity pattern contrast. The speckle contrasts decreases with square root of the number of patterns recorded.

Some embodiments of the present invention, use an optical phased array to suppress speckle pattern. In another embodiments, a coherent receiver is used to record the phase and amplitude of the same aperture and image is reconstructed digitally. Optical phased arrays have a wide range of applications in free-space data communications, LIDAR ranging and velocimetry, coherent imaging, integrated adaptive optics, holographic projection and recording, lens-less projection, lens-less display, and the like. If the target or the imaging system has no time-varying feature, the speckle pattern does not change over time and can be averaged using aperture sliding, in accordance with one embodiment of the present invention. To achieve this, embodiments of the present invention use a controller to turn on and off different receiving elements of a receiver aperture during different time intervals. The following description of the embodiments of the present invention are provided with reference to an optical phased array. It is understood, however, that other photonics system that have one or more arrays of transmitting or receiving elements may also be used to reduce the spatial coherence for speckle suppression.

In accordance with one aspect of the present invention, during a first time interval $T_1$, a first subset of the columns (or rows) of a phased array is activated by a controller to receive data representative of an image of a target. During a second time interval $T_2$, a second subset of the columns (or rows) of the phased array is activated to receive data representative of an image of the target. This process is repeated until the target is imaged by many or all subsets of the columns or rows.

Assume a first phased array receiver having an array of 400 receiving elements, arranged along 20 columns and 20 rows, with an array gain of 20 dB. Assume a second phased array receiver having an array of 600 receiving elements arranged along 30 columns and 20 rows. Activating only 20 columns (that may be consecutive) out of the 30 columns of the second phased array will generate an antenna gain that is the same as that of the first phased array. In accordance with one aspect of the present invention, by activating, for example, 20 columns of the second phased array during any given time interval to capture an image of the target, repeating this process, e.g., 10 times during each of which a different set of 20 consecutive columns is activated to capture the image of the target in a process referred to herein as aperture sliding, and using an averaging algorithm to average out the image data so captured, speckle suppression is achieved. It is assumed that the speckle size is equal to or smaller than the spacing between the receiving elements. Increasing the number of receiving elements from 400 to 600 (i.e., by 50%) results in a $\sqrt{11}\times$ reduction in the speckle pattern intensity. In another example, increasing the number of receiving elements from 400 to 900 so as to have a 30×30 array (i.e., a 125% increase in the number of receiving elements) reduces the speckle pattern intensity by $\sqrt{121}=11$.

Accordingly, if a phased array has an aperture size defined by (N+M) columns and N rows (i.e., an (N+M)×N array), activating at any given time an array subset defined by N columns and N rows (i.e., N×N array), enables the formation of (M+1) such subsets and therefore (M+1) images of the target that may be combined (such as averaged) to reduce the speckle pattern intensity by a factor of $\sqrt{M+1}$.

Similarly, if a phased array has an aperture size defined by (N+M) columns and (N+M) rows (i.e., an (N+M)×(N+M) array), activating at any given time an array subset defined by N columns and N rows (i.e., N×N array), enables the formation of $(M+1)^2$ such subsets and therefore $(M+1)^2$ images of the target that may be combined (such as averaged) to reduce the speckle pattern intensity by a factor of $\sqrt{(M+1)^2}=M+1$.

In general, since the target spec of the array is satisfied with an N×N array, a larger array such as (N+K)×N where $1 \leq K \leq M$, will also yield an image that can be used for coherent artificat averaging and suppression. In this way, M additional columns can be used to create (M+1)(M+2)/2 images for artifact suppression. If the array is expanded in two dimensions from an N×N array to an (N+M)×(N+M) array, $(M+1)^2(M+2)^2/2$ images can be obtained and averaged for speckle suppression.

Similarly, assume an array of 600 receiving elements disposed along 30 rows and 20 columns (i.e., a 30×20 array). Such an array may be divided into 11 sets of 20×20 array, 10 sets of 21×20 array, 9 sets of 22×20 array, 8 sets of 23×20, 7 sets of 24×20 array, 6 sets of 25×20 array, 5 sets of 26×20 array, 4 sets of 27×20 array, 3 sets of 28×20 array, 2 set of 29×20, and 1 set of 30×20 array. Combining the image data captured collectively by all such sets may result in a factor of $\sqrt{11+10+9+...+2+1}=\sqrt{66}$ reduction of speckle pattern intensity.

Figure 2:
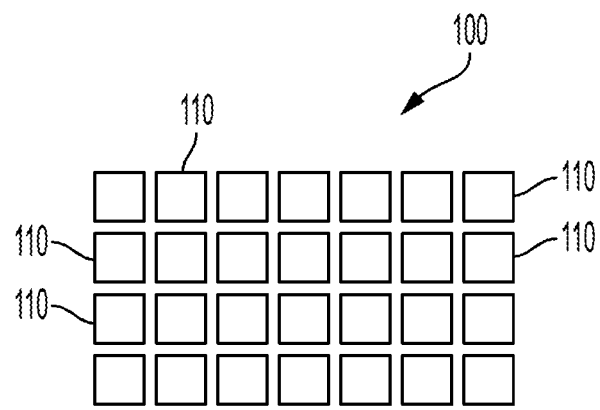
FIG. 2 shows a two-dimensional array of receiving elements of an optical phased array, in accordance with one embodiment of the present invention.
Figure 3A:
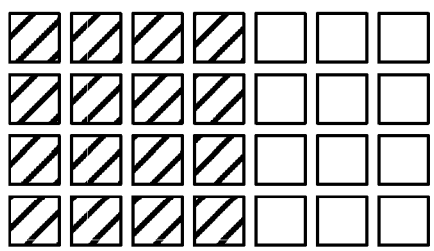
FIGS. 3A-3D show various subarrays of the phased array of FIG. 2 that may be activated at different times to form an image of a target, in accordance with one embodiment of the present invention.
Figure 3B:
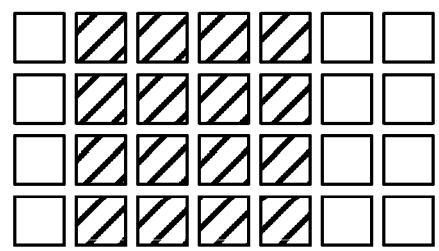
Figure 3C:
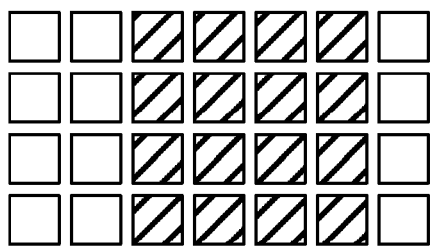
Figure 3D:
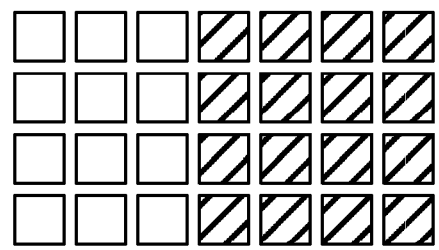

FIG. 2 shows an exemplary array 100 of 28 receiving elements 110 disposed along 4 rows and 7 columns and activated/deactivated by a controller, in accordance with one embodiment of the present invention. Assume array 100 is used in aperture sliding with each active array including 4 rows and 5 columns. FIGS. 3A-3D show the four sets of 4×4 subarrays (4 rows and 4 columns) of array 100 that may be activated at different time intervals by the controller, in accordance with one embodiment of the present invention, to generate different image data that are combined to form a final image that has a reduce the speckle intensity, as described above. The four sets shown in FIGS. 3A-3D provide $\sqrt{4}=2\times$ reduction of the speckle pattern intensity.

Figure 4A:
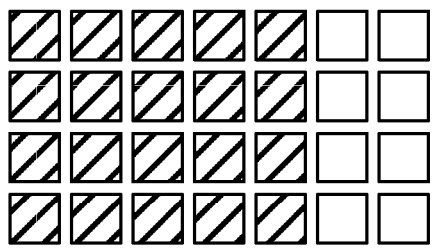
FIGS. 4A-4C show various subarrays of the phased array of FIG. 2 that may be activated at different times to form an image of a target, in accordance with one embodiment of the present invention.
Figure 4B:
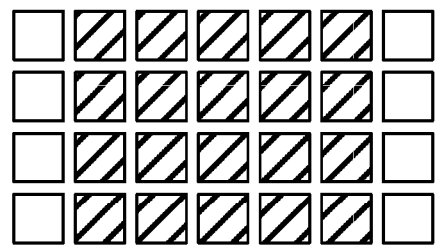
Figure 4C:
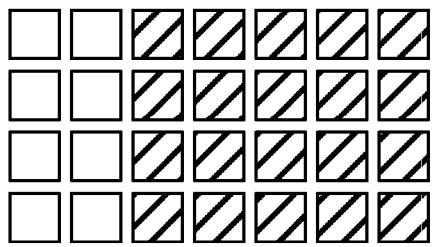
Figure 5A:
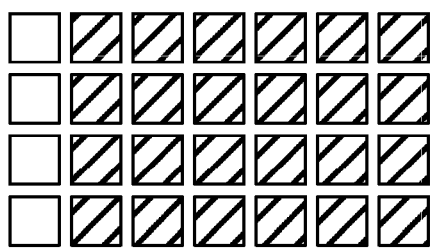
FIGS. 5A-5B show various subarrays of the phased array of FIG. 2 that may be activated at different times to form an image of a target, in accordance with one embodiment of the present invention.
Figure 5B:
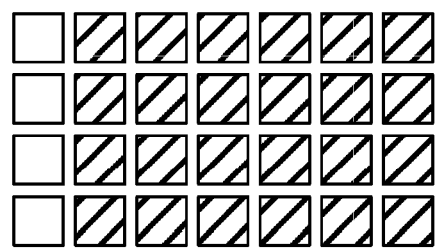

FIG. 4A-4C show the three sets of 5×7 subarrays of array 100 that may be activated at different time intervals by the controller, in accordance with one embodiment of the present invention, to reduce the speckle intensity, as described above. FIGS. 5A-5B show the two sets of 6×7 subarrays of array 100 that may be activated at different time intervals by the controller, in accordance with one embodiment of the present invention, to reduce the speckle intensity, as described above. The images taken by different subarrays at different time intervals are combined by the controller to reduce the speckle pattern density, in accordance with one embodiment of the present invention.

Figure 6A:
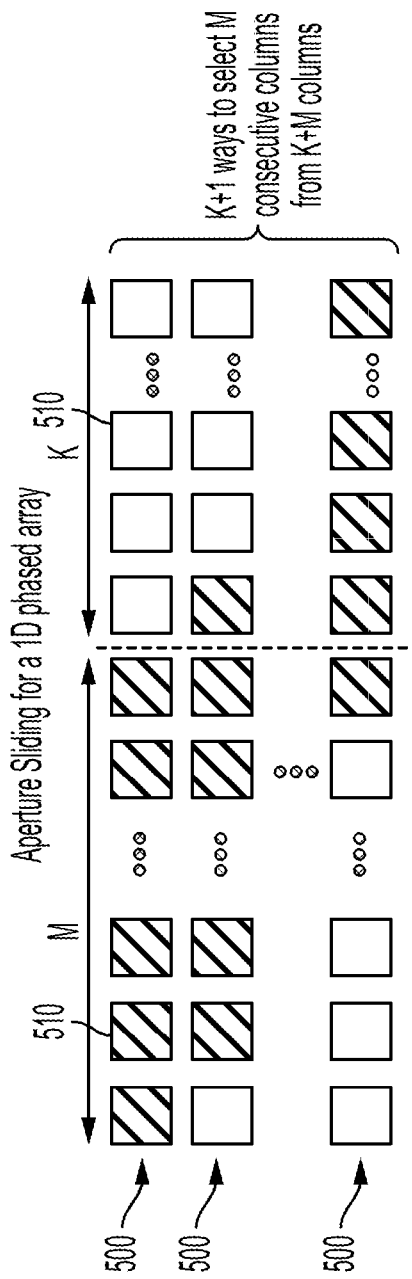
FIGS. 6A, 6B and 6C show various subarrays of a one-dimensional phased array that may be activated at different times to form an image of a target, in accordance with one embodiment of the present invention
Figure 6B:
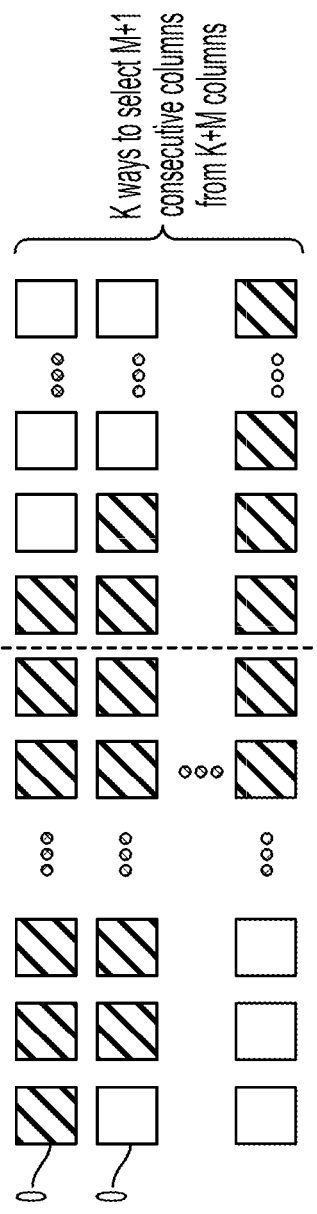
Figure 6C:

Aperture sliding, in accordance with embodiments of the present invention, may also be applied to a one-dimensional array of receiving elements. FIG. 6 shows an array 500 of receiving elements 510. Array 500 is assumed to include K+M column of receiving elements 510. As is seen, there are K+1 different ways of activating M receiving elements 510 at any given time. The activated receiving elements 510 in each row, each corresponding to a different subset of the M columns, are shown using cross-hatched squares. FIG. 6B shows the same one-dimensional array 500 except that in FIG. 6B, M+1 consecutive receiving elements are activated during any given time interval. As is readily seen, there are K different combinations of M+1 receiving elements. FIG. 6C shows the same one-dimensional array 500 except that in FIG. 6C, M+2 consecutive receiving elements are activated during any given time interval thus leading to K+1 different combinations of M+2 receiving elements.

Figure 7:
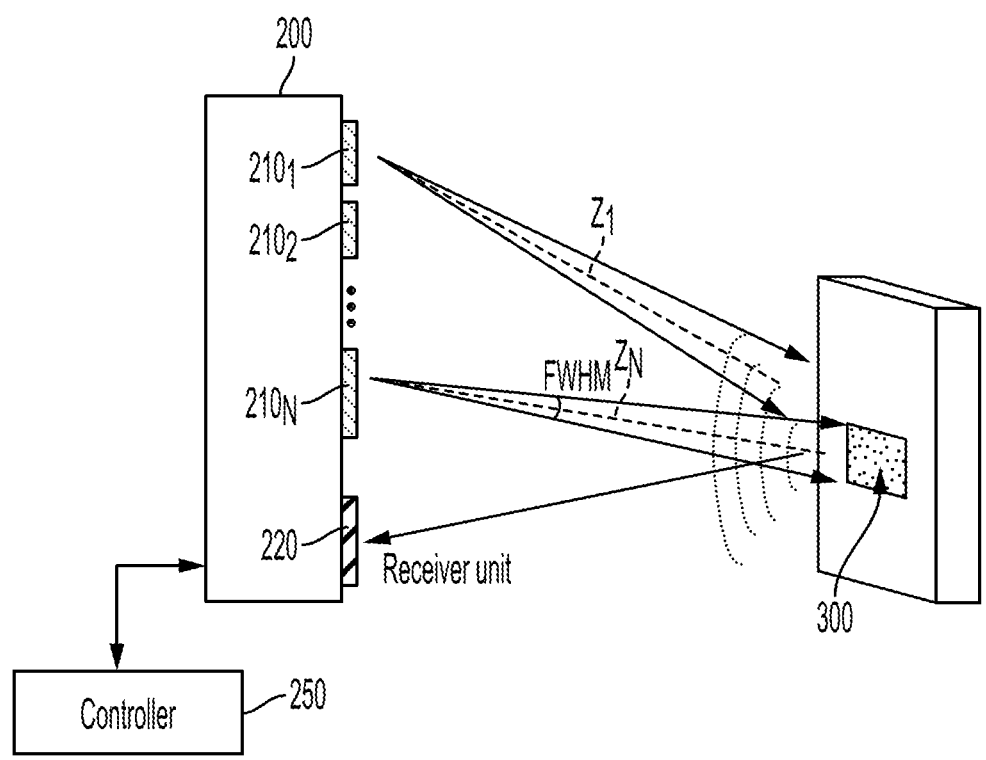
FIG. 7 shows an optical phased array transceiver, in accordance with one embodiment of the present invention.

In accordance with another embodiment of the present invention, spatially separated transmitting units are used to reduce the speckle patterns owing to the differences in the transmitting units' path lengths from the target. FIG. 7 shows an optical phased array transceiver 200 positioned to form an image of target 300. Transceiver 200 is shown as including, in part, N transmitting elements $210_i$, where i is an index ranging from 1 to N and where N is an integer greater than 1. Transceiver 200 is also shown as including, in part, a receiving unit 220 that captures the data generated by each transmitter, and a controller 250. Because different transmitting elements $210_i$ have different path lengths to target 300, transmitting elements $210_i$ generate different speckle patterns that when combined or averaged by controller 250, reduce the speckle pattern intensity. In some embodiments, multiple transmitting elements may be turned on at the same time. For example, during time interval $T_1$ transmitting elements $210_1, 210_2 \ldots 210_K$ may be tuned on, during time interval $T_2$ transmitting elements $210_{k+1}, 210_{k+2} \ldots 210_M$ may be tuned on, and during time interval $T_u$ transmitting elements $210_S, 210_{S+1} \ldots 210_N$ may be turned on, where K, M and S are integers. During each such time interval receiving unit 220 collects the image data which are subsequently processed by controller 250.

In some embodiments, an on-chip tunable source or integrated distributed feedback (DFB) lasers may be used to vary the imaging frequency. In other embodiments, a multitude of DFB lasers are integrated on chip and used to average and suppress the speckle pattern intensity.

In some embodiments, two or more polarizations are used to provide image data which are then combined or averaged to suppress the speckle pattern intensity. This can be achieved by polarization sensitive transmitter and receiver units. In one embodiment, dielectric scatter blocks and receivers are used.

Figure 8:
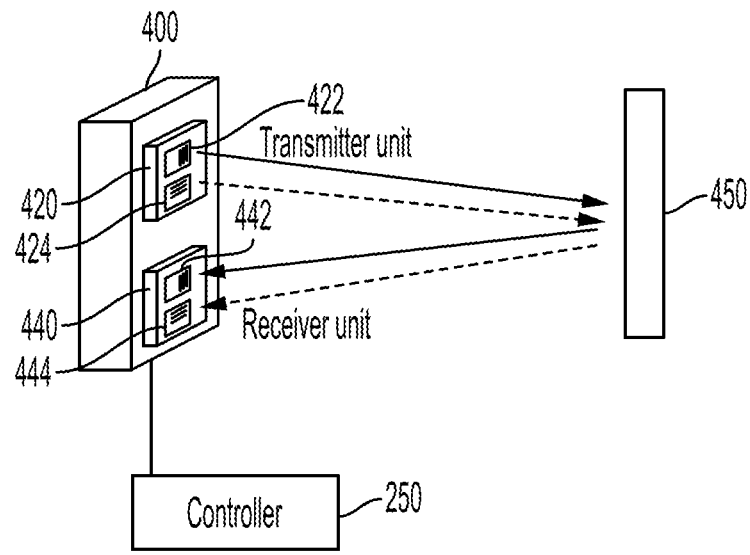
FIG. 8 shows an optical phased array transceiver, in accordance with one embodiment of the present invention.
Figure 9A:
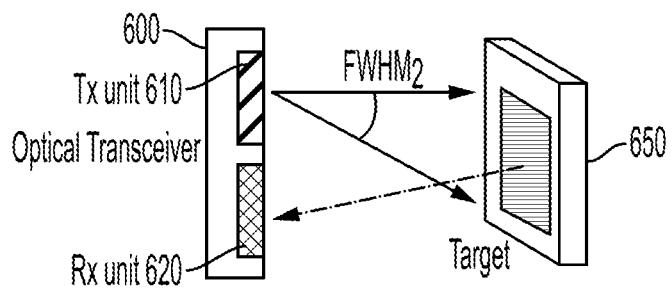
FIGS. 9A-9D show four different illumination spot sizes generated by transmit unit of an optical transceiver 600, in accordance with one embodiment of the present invention.
Figure 9B:
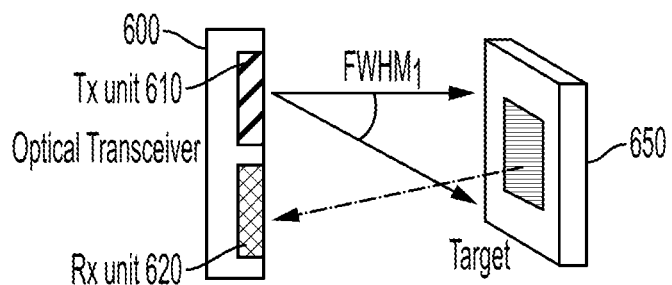
Figure 9C:
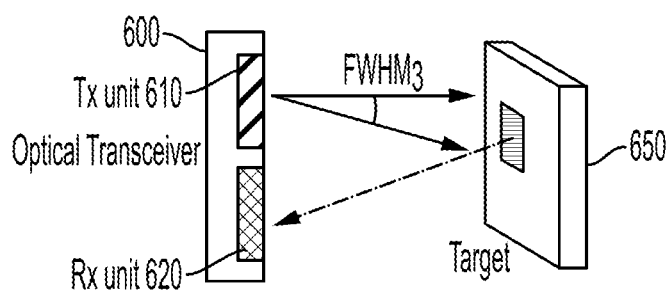
Figure 9D:
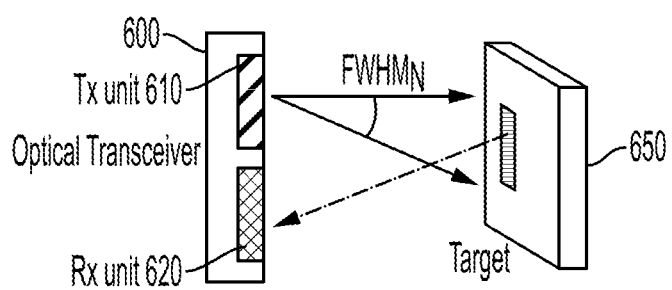

FIG. 8 shows a phased array 400 positioned to form an image of target 450. Phased array 400 is shown as including a transmitter 420 and a receiver 440. Transmitter 420, in turn, is shown as including a transmitting unit 422 which has a polarization along a first direction, and transmitting unit 424 which has a polarization along a second direction different from the first direction. Receiver 440 is shown as including a receiving unit 442 which has a polarization along the first direction, and a receiving unit 444 which has a polarization along the second direction. The optical signal transmitted by transmitting unit 422 and reflected off target 450 is received by receiving unit 442, and the optical signal transmitted by transmitting unit 424 and reflected off target 450 is received by receiving unit 444. Controller 250 combines the data received by receiving units 442 and 444 to generate an image of target 450. Because the image so generated by controller 250 is formed from two different polarization directions, the image has a suppressed speckle pattern intensity. Although phased array 400 is shown as having two transmitting elements and two receiving elements that are polarized along two different directions, it is understood that a phased array in accordance with embodiments of the present invention, may have many more transmitting element and receiving element pairs each having a different polarization direction.

In accordance with yet another embodiment of the present invention, speckle pattern intensity is reduced by changing the illumination spot size on the target. By altering the beam width generated by the transmitter, the spot size, and hence the speckle density changes thereby resulting in different speckle patterns induced on the receiver aperture FIGS. 9A-9D show four different illumination spot sizes on target 650 as generated by transmit unit 610 of optical transceiver 600. The illumination spot size may be varied by changing the amplitudes and/or phases of the transmitting elements of transmit unit 610. The illumination pattern and the beamwidth of the illumination can be changed mechanically by changing the relative location of the focusing mirrors. Alternatively, in an integrated optical phased array, it is possible to change the transmitter beam pattern. For an optical phased array with N transmitters, changing the relative phase and amplitude of the transmitters results in a change in the beam width, as shown in FIGS. 9A-9D.

Figure 10:
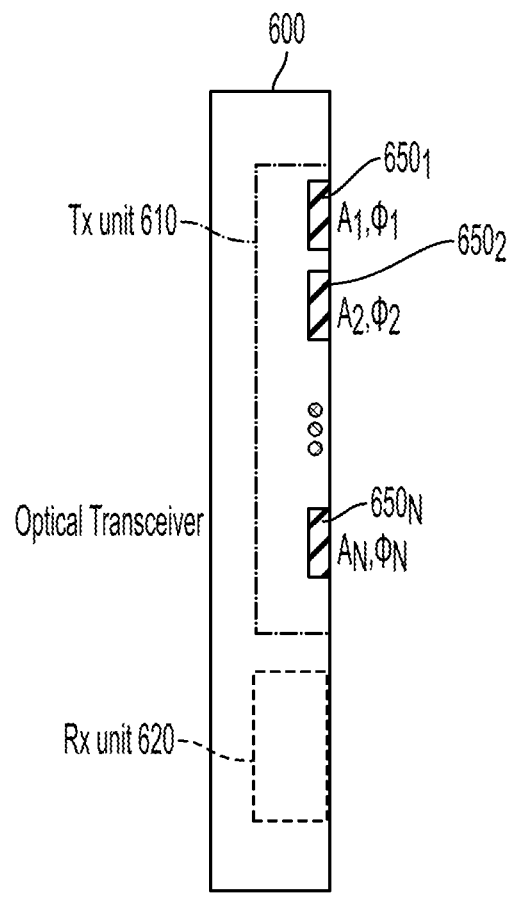
FIG. 10 is a more detailed view of the optical transceiver shown in FIGS. 9A-9D, in accordance with one embodiment of the present invention.

FIG. 10 provides a more detailed view of optical transceiver 600 of FIGS. 9A-9D. Transmitter unit 610 is shown as including, in part, N transmitting elements $650_1$, $650_2 \ldots 650_N$. Although not shown, it is understood that receiving unit 620 may also have a multitude of receiving elements.

The above embodiments of the present invention are illustrative and not limitative. Other additions, subtractions or modifications are obvious in view of the present disclosure and are intended to fall within the scope of the appended claims.

What is claimed is:

1. An optical phased array comprising:
   a plurality of receiving elements arranged along N rows and M columns; and
   a controller configured to:
   activate a first subset of the receiving elements during a first time interval to capture first data representative of a first image of a target;
   activate a second subset of the receiving elements during a second time interval to capture second data representative of a second image of the target; and
   combine the first and second data to generate a third image of the target.

2. The optical phased array of claim 1 wherein said first and second subsets share common receiving elements.

3. The optical phased array of claim 2 wherein said controller is further configured to compute an average of the first and second data to generate the third image of the target.

4. The optical phased array of claim 1 wherein said first subset represents a subset of the M columns.

5. The optical phased array of claim 4 wherein said second subset represents a second subset of the M columns different from the first subset, and wherein at least one of the M columns is common to both the first and second subsets.

6. The optical phased array of claim 5 wherein said first subset includes the N rows.

7. The optical phased array of claim 1 wherein said first subset represents a subset of the N rows.

8. The optical phased array of claim 7 wherein said second subset represents a second subset of the N rows different from the first subset, and wherein at least one of the N rows is common to both the first and second subsets.

9. The optical phased array of claim 8 wherein said first subset includes the M columns.

10. The optical phased array of claim 1 wherein said first and second time intervals are non-overlapping time intervals.

11. The optical phased array of claim 1 wherein said optical phased array is integrated in a semiconductor substrate.

12. A method of forming an image of a target, the method comprising:
    activating a first subset of the receiving elements of an optical phased array during a first time interval to capture first data representative of a first image of a target;
    activating a second subset of the receiving elements of the optical phased array during a second time interval to capture second data representative of a second image of a target; and
    combining the first and second data to generate a third image of the target.

13. The method of claim 12 wherein said first and second subsets share common receiving elements.

14. The method wherein 13 further comprising:
    computing an average of the first and second data to generate the third image of the target.

15. The method of claim 12 wherein said first subset represents a subset of the M columns.

16. The method of claim 15 wherein said second subset represents a second subset of the M columns different from the first subset, and wherein at least one of the M columns is common to both the first and second subsets.

17. The method of claim 16 wherein said first subset includes the N rows.

18. The method of claim 12 wherein said first subset represents a subset of the N rows.

19. The method 18 wherein said second subset represents a second subset of the N rows different from the first subset, and wherein at least one of the N rows is common to both the first and second subsets.

20. The method of claim 19 wherein said first subset includes the M columns.

21. The method of claim 11 wherein said first and second time intervals are non-overlapping time intervals.

22. The method of claim 11 wherein said optical phased array is integrated in a semiconductor substrate.

23. An optical phased array comprising:
a first transmitting element having a first polarization and adapted to transmit a first optical signal along the first polarization direction toward a target;
a second transmitting element having a second polarization and adapted to transmit a second optical signal along the second polarization direction toward the target;
a first receiving element having the first polarization and adapted to receive the first optical signal reflected off the target; and
a second receiving element having the second polarization and adapted to receive the second optical signal reflected off the target; and
a controller configured to form an image of the target in accordance with the first and second received optical signals.

24. An optical phased array comprising:
a first transmitter to generate a first illumination pattern on a target;
a second transmitter to generate a second illumination pattern on the target;
a receiver array that collects light reflected off the target in response to the first and second illumination patterns; and
a controller configured to operate the first and second transmitters during first and second non-overlapping time intervals thereby to form an image of the target by combining outputs of the receiver.

25. The optical phased array of claim 24 wherein said first transmitter includes an array of transmitting elements.

26. The optical phased array of claim 25 wherein said second transmitter includes an array of transmitting elements.

27. The optical phased array of claim 25 wherein said receiver includes an array of receiving elements.

28. The optical phased array of claim 27 wherein said second transmitter includes an array of transmitting elements.

29. The optical phased array of claim 24 wherein said optical phased array is integrated in a semiconductor substrate.

30. An optical phased array comprising of:
an array of transmitting elements each adapted to illuminate a target with an optical signal;
a receiver array adapted to receive the optical signals reflected off the target;
a controller configured to:
vary a phase and an amplitude of the signal transmitted by each transmitting element thereby to cause the transmitting elements to generate a first illumination pattern during a first time interval and a second illumination pattern during the second time interval, said first and second time intervals being non-overlapping time intervals; and
combine the optical signals received by the receiver array during the first and second time intervals to form an image of the target.

31. The optical phased array of claim 30 whereon said optical phased array is integrated in a semiconductor substrate.

* * * * *